(No Model.) 2 Sheets—Sheet 1.

G. P. HART.
MANUFACTURE OF DRIVE CHAIN LINKS.

No. 474,086. Patented May 3, 1892.

Witnesses.
Arthur G Beach.
Thomas Corscaden

Inventor.
George P. Hart.
By James Shepard
Atty.

(No Model.) 2 Sheets—Sheet 2.
G. P. HART.
MANUFACTURE OF DRIVE CHAIN LINKS.
No. 474,086. Patented May 3, 1892.
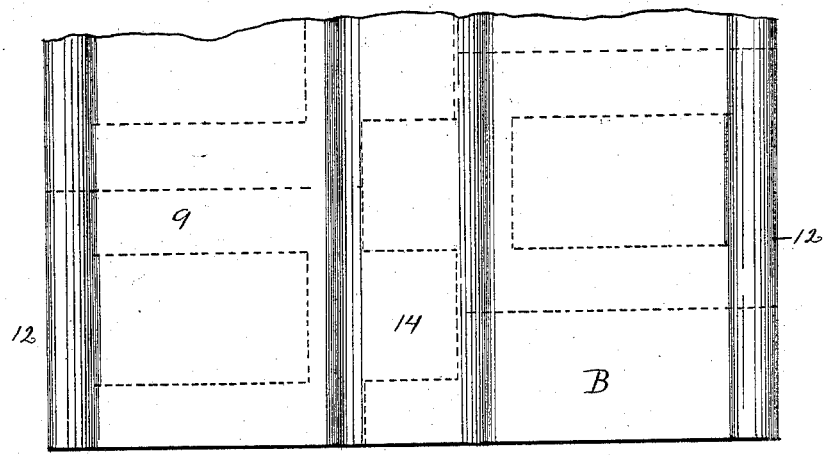
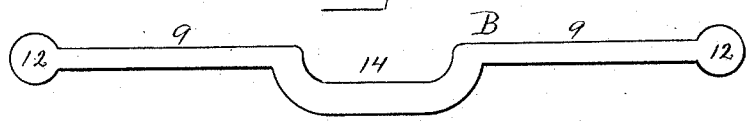
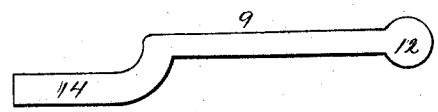
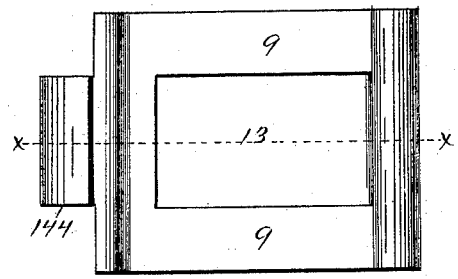
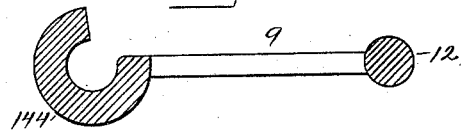
Witnesses.
Arthur G. Beach.
Thomas Corscaden
Inventor.
George P. Hart
By James Shepard
Atty.
THE NORRIS PETERS CO., PHOTO-LITHO., WASHINGTON, D. C.

UNITED STATES PATENT OFFICE.

GEORGE P. HART, OF NEW BRITAIN, CONNECTICUT.

MANUFACTURE OF DRIVE-CHAIN LINKS.

SPECIFICATION forming part of Letters Patent No. 474,086, dated May 3, 1892.

Application filed January 20, 1892. Serial No. 418,655. (No model.)

*To all whom it may concern:*

Be it known that I, GEORGE P. HART, a citizen of the United States, residing at New Britain, in the county of Hartford and State of Connecticut, have invented certain new and useful Improvements in the Manufacture of Drive-Chain Links, of which the following is a specification.

My invention relates to improvements in the manufacture of drive-chain links; and the objects of my improvements are to produce the links at a small cost, to make a substantial link by the proper distribution of metal, and to produce a rolled bar or plate that is especially adapted for forming such links by cutting them from said bar.

Figure 1:
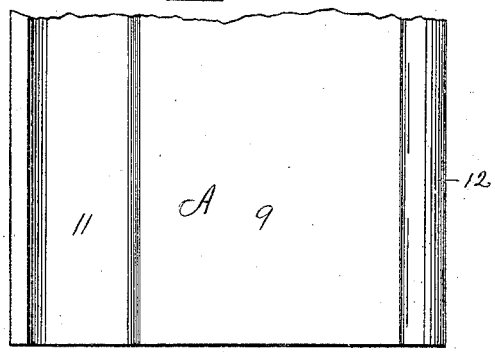
Figure 2:
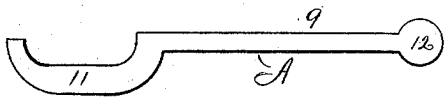
Figure 3:
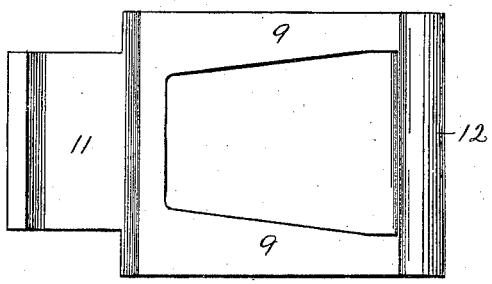
Figure 4:
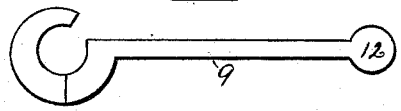

In the accompanying drawings, Figure 1 is a side elevation of a rolled plate or bar from which I cut chain-link blanks. Fig. 2 is an end view of the same. Fig. 3 is a plan view of a link-blank as cut from said bar. Fig. 4 is an edge view of a link formed from the blank in Fig. 3 by rolling or bending the hook or knuckle portion. Fig. 5 is a side elevation of a wider rolled bar from which I cut two rolls of blanks, the broken lines therein indicating the lines of cutting. Fig. 6 is an edge view thereof. Fig. 7 is an edge view of one link-blank as cut therefrom. Fig. 8 is a plan view of a completed link, and Fig. 9 is a sectional view thereof on the line $x\ x$ of Fig. 7.

The general form of my chain-link is old. The bar or plate A, Figs. 1 and 2, is formed by rolling and is of a width equal to the length of one link-blank, while its length may vary according to convenience and circumstances, as in bars or plates of iron generally. This bar is provided with a flat plate-like portion 9 of a thickness equal to that of the side bars or body portion of the finished link, a thicker knuckle forming portion 11, preferably somewhat curved in end view, so as to form a projecting rib on one side of the bar, while the reversed side is grooved or depressed, as shown in Figs. 1 and 2. I also prefer to make the edge of the bar at this knuckle-forming portion somewhat thinner than the rest of said portion and to curve said edge, as shown in Fig. 2. The opposite edge of the bar has a rounded bead 12 to form the pintle portion of the links. Such bars may be formed by rolling at any suitable works and sold to manufacturers to be worked up into chain-links at other places. After making or having made for me such a bar I cut link-blanks therefrom by suitable dies and punches into the form shown in Fig. 3, the knuckle-forming portion being cut somewhat narrower than the complete link. A hole 10 is cut from the plate-like portion adjacent to the bead 12, which forms the pintle portion of the link, leaving a suitable width at each side edge of the link to form side bars that connect said knuckle and pintle forming portions, as shown in Fig. 3. I prefer to make said hole at the pintle end just wide enough to receive the narrowed end of the knuckle-forming portion 11, while the opposite end of said hole may be narrower to give increased strength to the side bars. As shown, the knuckle-forming portion 11 is curved at its outer end and at its junction with the side bars of the link on a radius about equal to that of the pintle portion or bead 12, while that part of the knuckle-forming portion which lies between these curves is straight. After cutting link-blanks, Fig. 3, from a bar A, I next roll or curve the knuckle-forming portion of the link-blank into the knuckle portion 11, changing it from the form shown in Figs. 2 and 3 to that shown in Fig. 4, thereby practically completing the link. The links, however, may then be struck in dies or tumbled in a rolling-barrel to smooth them up.

In Figs. 5 to 9, inclusive, I have shown substantially the same improvement, only the plate or bar B is rolled of a width sufficient for cutting two rows of blanks. Therefore I make the thickened knuckle-forming portion in the middle of the width of the bar, the plate-like portions on the sides thereof, and the pintle-forming beads at the edges of the bar, as shown. The broken lines in Fig. 5 show the lines on which the blanks are cut in punching out the link-blanks. The reduced or narrowed portions of the knuckle-forming blanks are made somewhat narrower than in the form of link first described, whereby one such portion for a link in one row of blanks may be cut from between two such portions in the opposite row to economize stock. The hole 13 in the body of the link is made with parallel sides. It may also be noticed that the outer end of the knuckle-forming portion in the blanks thus cut out is not curved, as shown in Fig. 7. If desired, the bars for a single row of blanks may have the same form in end view as the edge view of the link-blank shown in Fig. 7. The blanks thus formed have their knuckle-forming portion 14 bent or rolled into a knuckle portion 144, as shown in Figs. 8 and 9, thereby practically completing the links.

In use the pintle portion of one link is slipped endwise through the opening in the knuckle portion of another link as the two links are doubled upon themselves until the outer end of the knuckle portion registers with the opening in the body of the link. The links are then turned on the joint at their connected ends to bring them into alignment with each other, all as in other chains of this class.

While I prefer to form the bead-like pintle-forming portion on the bar, it is evident that all the advantages of a bar with plate-like portion and thickened knuckle-forming portion and cutting and forming the link-bodies and knuckle portions therefrom would be attained in a bar whose pintle-forming portion was not in bead-like form.

I claim as my invention—

1. The herein-described method of making drive-chain links, which consists in forming a bar of rolled metal with a rounded bead-like pintle-forming portion, a thickened knuckle-forming portion and a plate-like body-forming portion between said pintle and knuckle forming portions, then cutting out link-blanks therefrom transversely to the lengths of said portions, and then rolling or curving the knuckle-forming portion into a knuckle, substantially as described, and for the purpose specified.

2. The bar for forming drive-chain links herein described, having a pintle-forming portion, a thickened knuckle-forming portion, part of which is curved on a radius substantially equal to that of the link-pintle, and a plate-like portion for forming the body of the link-blanks between said pintle and knuckle forming portions, substantially as described, and for the purpose specified.

3. A bar for forming drive-chain links, having longitudinal bead-like pintle-forming portions, a plate-like portion for forming the body of the links, and a thickened knuckle-forming portion extending longitudinally with said bar and having a portion curved on a radius about equal to that of the curve of said pintle-forming portion, substantially as described, and for the purpose specified.

GEORGE P. HART.

Witnesses:
G. L. REYNOLDS,
G. L. VANNAIS.